Jan. 6, 1970     B. WEINSTEIN     3,487,693
DISPOSABLE THERMOMETER
Filed Aug. 6, 1968
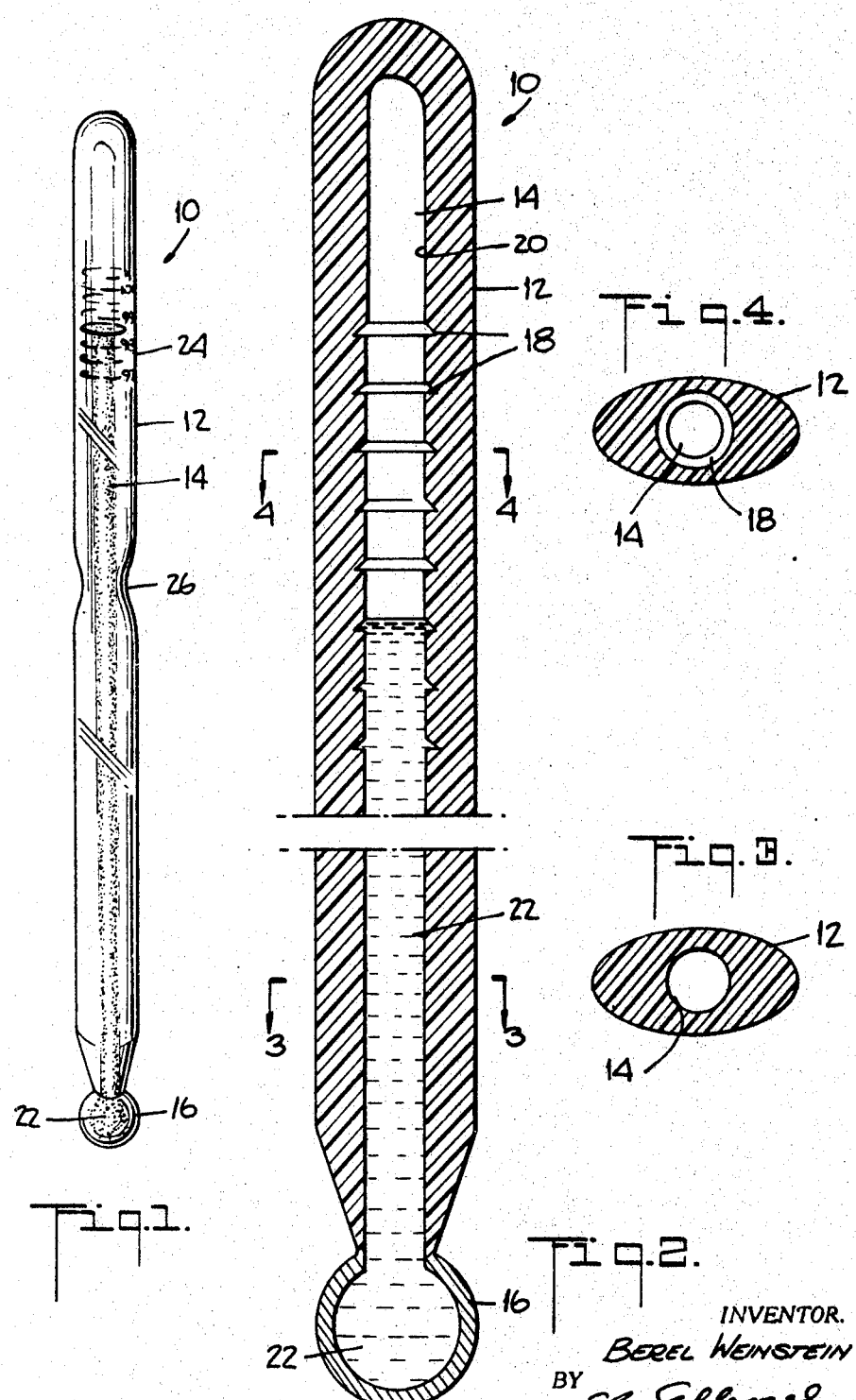
INVENTOR.
BEREL WEINSTEIN
BY
ATTORNEY United States Patent Office 3,487,693
Patented Jan. 6, 1970

3,487,693
DISPOSABLE THERMOMETER
Berel Weinstein, New York, N.Y., assignor to Computronic Sciences, Inc., New York, N.Y., a corporation of New York
Filed Aug. 6, 1968, Ser. No. 750,574
Int. Cl. G01k 1/04
U.S. Cl. 73—371                                   8 Claims

ABSTRACT OF THE DISCLOSURE

A disposable thermometer comprising a transparent plastic tube, having a capillary channel axially disposed therein and provided with a serrated wall, integral with a hollow globe secured to its base and opening into the channel, with the globe containing a heat expansible liquid in solution with a staining material, and a calibrated temperature scale provided on the surface of the tube in registry with its channel.

---

This invention relates to the field of heat or temperature measurement, and has for its objective the creation of a thermometer which will provide a permanent record of a patient's temperature at a given time, and which is so inexpensive to produce that it may be discarded after one use thereof, after its function as a permanent record is no longer required.

In the present state of the art thermometers, and particularly clinical thermometers, consist of glass capillary tubes having enlarged bases in which there is confined a specific quantity of mercury, a substance having measureable physical properties, subject to change by change in temperature, expanding when heat is applied and contracting when cold is applied. The thermometers are calibrated in degrees and fractions of degrees of heat, to indicate the temperature to which the base is subjected.

Numerous disadvantages are found in the use of thermometers of this type. Chief among these is the fact that, since mercury is subject to surface tension and capillary attraction, not all of the mercury is utilized for expansion. With deviations in the areas of its confinement, it is necessary that each thermometer be individually calibrated after the mercury has been enclosed, which is a time and labor consuming procedure. Again, since these thermometers are used continually for patient after patient, the danger of transferral of an infectious disease, such as infectious hepatitis, from one patient to another, is ever present, since the usual alcohol wash will not destroy the causative virus. Further, where the nurse or other administering person forgets to "shake down" the thermometer after use with one patient, there is likelihood that an incorrect reading may be obtained for the next patient. Also, since these thermometers are made of glass, breakage occurs frequently, with danger from the broken glass and from exposure of the mercury, to say nothing of the cost of replacement, and the inventory problems involved. The foregoing, and many other disadvantages, are eliminated by my invention, as well become apparent.

It is therefore the principal object of my invention to provide a thermometer which is so inexpensive to produce that it is discardable after one use.

A second important object of my invention lies in the provision of a thermometer upon which a permanent record of the patient's temperature, at the time of its taking, will be made.

A third important object of my invention lies in the provision of a disposable thermometer which can be mass-produced with precision calibration.

Still another important object of my invention lies in the provision of a thermometer which can be easily broken and discarded with complete safety.

These and other salient objects, advantages and functional features of my invention, together with the novel features of construction, composition and arrangement of parts, will be more readily apparent from an examination of the following description, taken with the accompanying drawings, wherein:

FIG. 1 is a front view of a preferred embodiment of my invention:
FIG. 2 is an enlarged cross-sectional view, partly broken away, of the embodiment of FIG. 1;
FIG. 3 is a cross-sectional view, taken on lines 3—3 of FIG. 2; and
FIG. 4 is a cross-sectional view, taken on lines 4—4 of FIG. 2.

Similar character references designate similar parts throughout the different views.

Referring now to the drawings, my thermometer 10 comprises a tube 12, composed of a clear and transparent plastic material, having a central channel 14 running axially therethrough with an opening at the bottom thereof. A hollow globe 16, preferably composed of a hard wax, is heat-sealed to the base of the tube 12, affording communication between the interior of the globe 16 and the capillary channel 14. A plurality of spaced, parallel serrations or corrugations 18 are provided in the wall 20 of the tube 12, transverse its axis, with their valleys opening into and in communication with the interior of the capillary channel 14, as shown by FIG. 2.

The globe 16, prior to its being sealed to the tube 12, is provided with a measured quantity of an expansible liquid, having measureable physical properties which change with temperature change, in solution with a staining material to form a compound 22. In this preferred embodiment I prefer to use a combination of alcohol in solution with methylrosaniline chloride, commonly known as "gentian violet," with due allowance for the change in the coefficient of expansion of the alcohol resulting from the inclusion of the latter in the compound 22.

A scale 14, calibrated in heat degrees and fractions thereof, is provided on the outer surface of the tube 12, adapted to indicate, in accordance with the level to which the compound 22 rises in the capillary channel 14, the amount of heat to which the globe 16 has been subjected.

The tube 14 is further provided tapered, as at 26, intermediate its ends, to provide a weakened area when it is desired to break and discard the thermometer 10 after it has served its purposes.

Since the compound 22, as described above, comprises a liquid which does not have the surface tension and capillary attraction qualities of substances, such as mercury, and which consequently will provide a uniform rate of expansion for a uniform area, the tubes 12 can be calibrated by mass-production methods, as is well known, rather than require the individual scale calibration for each thermometer, as is necessary with present types of mercury thermometers.

In the construction of my invention, a predetermined quantity of the liquid compound 22 is placed within the globe 16, and the latter is then sealed to the base of the tube 12, which has already been provided with its scale 24. The thermometer 10 is then ready for use.

When the thermometer 10 is applied to a patient the liquid compound 22 will rise into the capillary channel 14 to a height in accordance with the temperature of the patient, thereby staining the wall of the channel 14 to the extent of the rise, thereby permanently indicating therein the patient's temperature at that time, the mark remaining, both on the wall of the channel 14 and in the serrations or corrugations 18, even after the thermometer 10 has been removed from the patient, and the compound 22 has receded within the channel 14. The thermometer 10 will thus show a permanent record of the patient's temperature at the time it was taken, for so long as the knowledge is required. When no longer required, the thermometer 10 may be easily broken across the reduced area 26, and discarded without injury or damage.

In view of the low cost of production of my thermometer 10, it is intended to be discarded after one use, thereby eliminating the danger of communicating disease from one patient to another. It will be factory sterilized and sealed in an individual envelope so that accidental exposure to dirt or germs will be avoided. It will also reduce inventory-keeping, for hospitals and the like, because as the stock of thermometers on hand dwindles additional quantities may be reordered.

From the foregoing it is to be noted that what has been shown by the drawings, and described, is a preferred embodiment by way of illustration and not of limitation, and that various changes may be made in the construction, composition and arrangement of parts without limitation upon or departure from the spirit and scope of the invention, or sacrificing any of the advantages thereof inherent therein.

Having described my invention, I claim:

1. A disposable thermometer comprising a transparent tube provided with
    liquid containing means integral with its base,
    a capillary channel disposed axially within the tube, opening into the liquid containing means, and provided with an irregular wall,
    the liquid containing means provided with a heat expansible liquid in solution with a staining material, and
    a calibrated temperature scale provided on the outer surface of the tube in registry with the channel.

2. A disposable thermometer as described in claim 1, the liquid containing means comprising a hollow globe.

3. A disposable thermometer ts described in claim 1, the channel wall provided with a plurality of spaced parallel serrations on planes transverse the axis of the channel.

4. A disposable thermometer as described in claim 1, the channel wall being corrugated.

5. A disposable thermometer as described in claim 1, the heat expansible material being alcohol.

6. A disposable thermometer as described in claim 1, the staining material being methylrosaniline chloride.

7. A disposable thermometer as described in claim 1, the tube being composed of a plastic material.

8. A disposable thermometer as described in claim 1, the tube being centrally reduced in circumference.

References Cited

UNITED STATES PATENTS

| | | | |
|---|---|---|---|
| 1,301,910 | 4/1919 | Collins | 73—292 |
| 2,795,140 | 6/1957 | Loeb | 73—371 |

LOUIS R. PRINCE, Primary Examiner

WILLIAM A. HENRY II, Assistant Examiner